United States Patent [19]

Hsei

[11] 4,396,510
[45] Aug. 2, 1983

[54] MASS TRANSFER DEVICE

[75] Inventor: Paul Hsei, Huntington Beach, Calif.

[73] Assignee: Bio-Med Corporation, Santa Ana, Calif.

[21] Appl. No.: 223,390

[22] Filed: Jan. 8, 1981

[51] Int. Cl.³ .............................................. B01D 31/00
[52] U.S. Cl. .................................. 210/321.3; 210/450; 210/456
[58] Field of Search ............... 422/48; 165/174, 175; 55/158; 210/456, 450, 433.2, 321.1, 321.3, 323.1

[56] References Cited

U.S. PATENT DOCUMENTS

| | | | |
|---|---|---|---|
| 3,442,002 | 5/1969 | Geary, Jr. et al. | 55/158 X |
| 4,031,012 | 6/1977 | Gics | 55/158 X |
| 4,038,190 | 7/1977 | Baudet et al. | 210/321.1 |
| 4,201,673 | 5/1980 | Kanno et al. | 210/456 X |
| 4,237,013 | 12/1980 | Yamazaki et al. | 210/456 X |
| 4,239,729 | 12/1980 | Hasegawa et al. | 422/48 |
| 4,289,623 | 9/1981 | Lee | 210/456 X |

Primary Examiner—Frank A. Spear, Jr.
Attorney, Agent, or Firm—James E. Brunton

[57] ABSTRACT

A separatory apparatus for selectively separating components of multi-component fluids in which a multiplicity of contiguous capillary fibers are uniquely arranged and supported within a housing having a non-cylindrically shaped central portion. In the primary application of the device a multicomponent fluid such as blood flows interiorly of the fibers and a dialysate flows externally of the fibers. Embodied proximate the fluid inlet portion of the device is a uniquely configured fluid distribution element which stratigically positions the fibers and directs the flow of the external fluid, or dialysate, uniformly through the passageways defined by the external walls of the fibers. In this way channeling of the fluid is eliminated and a uniform fluid flow along the external surfaces of each fiber is realized. In this way all of the fibers can be effectively used for mass transfer thereby markedly improving the overall efficiency of the device.

4 Claims, 10 Drawing Figures

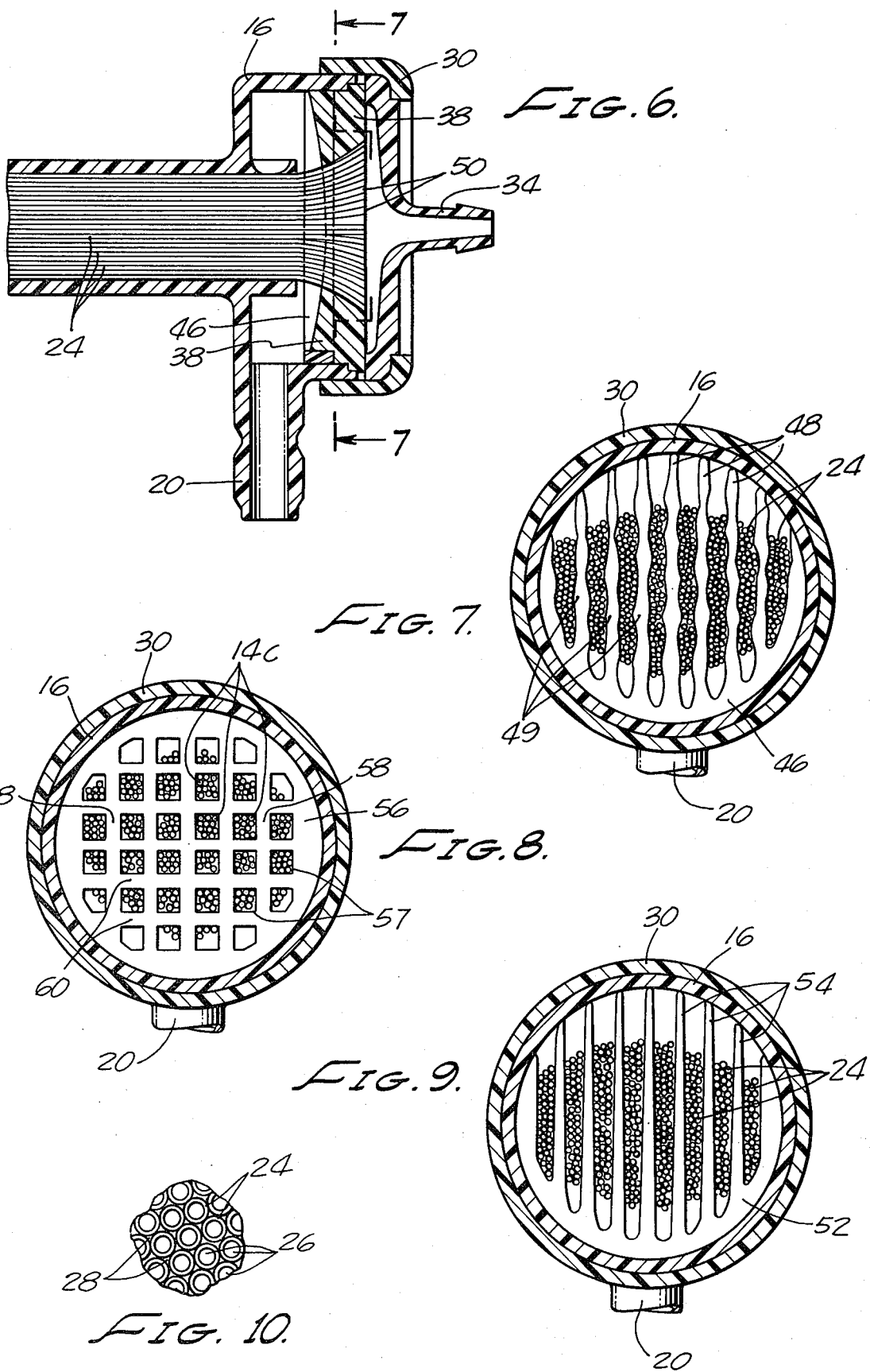

MASS TRANSFER DEVICE

BACKGROUND OF THE INVENTION

1. Field of the Invention

The present invention relates generally to mass transfer devices. More particularly the invention concerns a unique permeability separatory apparatus adapted to effectively resolve the different components of multicomponent fluids.

2. Discussion of the Invention

A number of designs exist for mass transfer devices and separatory apparatuses using small hollow capillary fibers that function as semi-permeable membranes. The methods for making these devices are well known.

These mass transfer devices typically use a number of hollow capillary fibers enclosed in a rigid housing with appropriate inlet and outlet fittings. The fibers generally extend from end to end in this housing and are encapsulated at each end with a potting compound. Typically the central portions of the fibers are unsupported. The ends of the fibers are open to allow the flow of a liquid. Sealing means are provided by the potting compound allowing flow of one fluid, for example, blood, through the fibers while a second fluid, for example, dialysate, flows around the exterior of the fibers.

A common drawback of all prior art mass transfer devices known to applicant resides in the fact that all use large bundles of fibers without providing any type of means for precluding the channeling of the external (dialysate) fluid around the fiber bundle. Such channeling markedly reduces efficiency of the devices and renders them marginal for certain applications.

Exemplary of prior art mass transfer devices are the devices described in U.S. Pat. Nos. 3,228,876 and 3,228,877 issued to H. I. Mahon. These devices represent the most pertinent art known to applicant and serve to clearly illustrate the novel aspects of the devices of the present invention as described hereinafter. In the Mahon devices, the fiber bundle is housed within a cylindrical shaped housing with the ends of the bundle being supported within a suitable potting compound. More particularly, Mahon seeks to achieve the announced objects of his invention by providing a cell that incorporates a specific membrane element comprising a multiplicity of substantially unsupported, fine, continuously hollow fibers.

To ensure maximum efficiency, the devices of the present invention embody means to prevent dead spaces within the fiber bundles and to preclude channeling of the external fluid around the fiber bundles. In this way the total capabilities of the fiber membranes are brought to bear to maximize the fiber transport potential of the device. More particularly the deficiencies of the prior art devices are largely overcome in the devices of the present invention through the use of a multiplicity of fiber bundles which are effectively supported within non-cylindrical housings. The reduced cross-section of the individual fiber bundles in conjunction with the non-cylindrically shaped housings permit increased penetration of the dialysate or rinsing liquids thereby making the mass transfer substantially more efficient. To further guard against fluid channeling and to maximize uniform fluid flow along the external surfaces of the individual fibers which form the fiber bundles, uniquely configured fluid diverter elements are stratigically placed within the devices. These elements are configured to optimize the fluid flow characteristics of the units and to eliminate the highly undesirable fluid channeling exhibited by prior art units.

SUMMARY OF THE INVENTION

A primary object of the present invention is to provide a unique separatory apparatus in which the hollow fibers comprising the transfer membranes of the device are uniquely positioned with a specially configured housing so as to ensure uniform fluid flow along the external surfaces of each fiber thereby maximizing the mass transfer efficiency of the device.

Stated another way, a primary object of the invention is to provide a uniquely configured device in which the hollow fibers which comprise the transfer membranes are supported within the device in a manner to prevent channeling of the external fluid, for example a dialysate, around the fibers whereby all of the fibers can be used for mass transfer.

Another object of the invention is to provide a device of the character described in which the housing supporting the hollow fibers is specifically configured to minimize any tendency for channeling of the external fluid.

Another object of the invention is to provide a device as described in the preceeding paragraphs in which there is provided distributor means for controlling the flow of external fluid toward the hollow fibers to ensure uniform fluid flow around each of said fibers.

Still another object of the invention is to provide a device of the character described in the preceeding paragraph in which the distributor means functions to cause the ends of the hollow fibers to diverge radially outwardly within the fluid inlet portion of the device thereby optimizing fluid flow around the individual fibers.

A further object of the invention is to provide a mass transfer device which can be adapted for use in a wide variety of applications including blood purification, removal of glycol from frozen blood, desalination of sea water and various other osmosis, reverse osmosis and dialysis processes.

Still another object of the invention is to provide a separatory apparatus of the class described which is highly efficient, completely reliable in operation and inexpensive to manufacture.

In summary, these and other objects of the invention are realized by a separatory apparatus for selectively separating components of multi-component fluids, comprising an elongated housing including a non-cylindrically shaped central hollow body portion having a first fluid inlet and a first fluid outlet; at least one fiber bundle housed within and supported by said central hollow body portion, said fiber bundle comprising a multiplicity of longitudinally extending, capillary fibers each having an interior bore throughout its length, said fibers being arranged within each said bundle to provide a multiplicity of substantially uniform fluid flow passageways interiorly of said fibers and exteriorly between said contiguous fibers; sealing means disposed within said housing for preventing fluid flow between said first fluid inlet and the interior bores of said hollow fibers, said sealing means being configured and arranged to cause said first fluid to flow uniformly through said fluid flow passageways between contiguous hollow fibers; and sealing means disposed within said housing for preventing fluid flow between said interior bores of said hollow fibers and said first fluid outlet.

BRIEF DESCRIPTION OF THE DRAWINGS

FIG. 6 is a fragmentary cross-sectional view of one end of the device of a comb-like distribution device.

FIG. 7 is a cross-sectional view taken along lines 7—7 of FIG. 6.

FIG. 8 is a cross-sectional view similar to FIG. 7 but showing another form of the invention embodying a differently configured distribution device.

FIG. 9 is a cross-sectional view similar to FIGS. 7 and 8 showing yet another form of the invention embodying a differently configured distribution device.

FIG. 10 is a fragmentary view, greatly enlarged, to show the configuration of the hollow fiber membranes which extend longitudinally of the device and illustrating the fluid flow passageways between the fibers.

DESCRIPTION OF THE PREFERRED EMBODIMENT OF THE INVENTION

Figure 1:
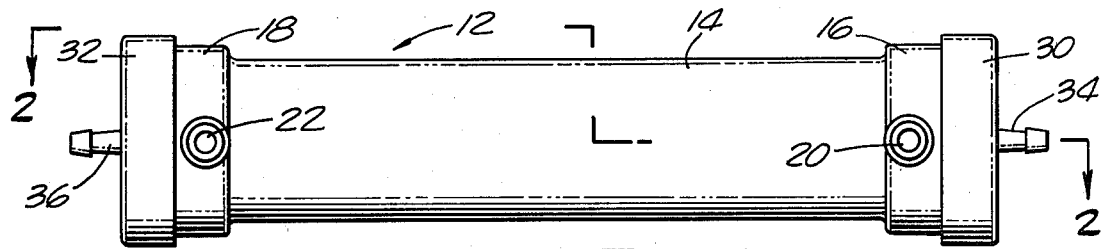
FIG. 1 is a plan view of one form of Mass Transfer Device of the invention.
Figure 2:
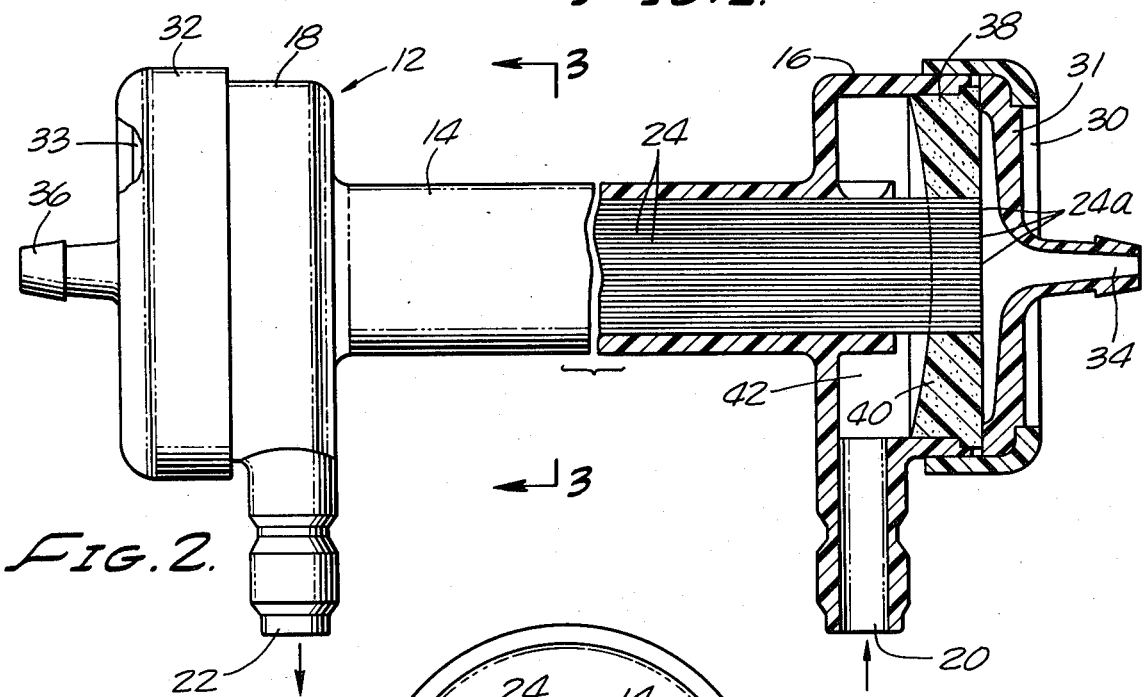
FIG. 2 is a side elevational view taken along lines 2—2 of FIG. 1, and partly broken away to show internal construction.
Figure 3:
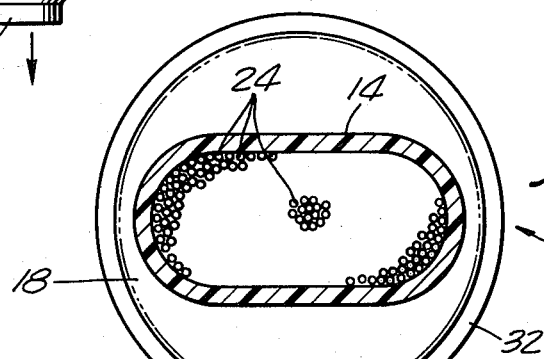
FIG. 3 is a cross-sectional view taken along lines 3—3 of FIG. 2 showing the unique cross-sectional configuration of the body of the Mass Transfer Device.

Referring to the drawings, and particularly to FIGS. 1 through 3, the Mass Transfer, or Separatory, Device of the invention for selectively separating components of multicomponent fluids comprises an elongated housing 12, including a non-cylindrically shaped central body portion 14 and integral first and second enlarged end portions 16 and 18 respectively. Both end portions of the housing are preferably circular in cross-section at any point. First end portion 16 is provided with a first fluid inlet 20 for passage of a first fluid and second end portion 18 is provided with a first fluid outlet 22 adapted for passage of a second fluid.

Housed within, and supported by, the central body portion 14 are a plurality of fiber bundles each of which comprises a multiplicity of longitudinally extending, contiguous capillary fibers 24. Referring also to FIG. 10, it can be seen that each capillary fiber 24 has an interior bore 26 throughout its entire length and each has open first and second end portions extending respectively into the first and second end portions 16 and 18 of housing 12. As illustrated in the drawings, fibers 24 are arranged within the fiber bundles to provide a multiplicity of substantially uniform fluid flow passageways interiorly of the fibers through the internal bores 26 and exteriorly between contiguous fibers through exterior passageways 28 (FIG. 10).

Closure means adapted to close the first and second end portions of the housing 12 are provided in this embodiment of the invention in the form of first and second covers 30 and 32 respectively. First closure means, or cover 30, includes a funnel shaped member 31 defining a second fluid inlet 34 which is in communication with the first end portions 24a (FIG. 2) of the hollow fibers 24 for passage of a third fluid.

Second closure means, or cover 32, is similarly configured and includes a funnel shaped member 33 defining a second fluid outlet 36 in communication with the opposite, or second end portion of the hollow fibers 24 for passage of a fourth fluid. The nature of the first, second, third and fourth fluids adapted to flow through the apparatus will be described hereinafter.

In order to prevent the flow of fluid between the first fluid inlet 20 and the interior bores 26 of the fiber ends designated as 24a in FIG. 2, there is provided sealing means disposed within the first end portion 16 of housing 12. This sealing means which may take the form of various commercially available potting compounds, presently to be described, is configured into a disc-like element 38 having a concave inner surface 40 (FIG. 2). The shape of disc 38 is adapted to cause the first fluid flowing through passageway 20 to flow uniformly through the exterior fluid flow passageways 28, defined between contiguous hollow fibers 24. It is this important aspect of the invention which, in conjunction with the non-cylindrical shape of the central body portion 14, minimizes channeling of the first fluid and encourages a uniform flow of fluid along the external surfaces of each of the fibers 24. In this way, the fiber transport potential of the device is greatly enhanced and maximum penetration of the first solution through the semipermeable walls of the fibers is assured.

With the arrangement of the device shown in FIGS. 1 through 3, the third fluid, which, for example, can be a multi-component fluid such as blood, is introduced through inlet 34 and flows uniformly through the internal bores 26 provided in each of the hollow fibers 24 (FIG. 10). At the same time, the first fluid, which may take the form of a dialysate fluid, is introduced through inlet 20. This first fluid flows from inlet 20 into the interior chamber designated by the numeral 42 in FIG. 2, and then flows uniformly into the multiplicity of passageways 28 formed between the contiguous fibers 24. In this way, the first fluid, for example, a dialysate, is uniformly flowing through the passageways 28 while at the same time the multi-component fluid is uniformly flowing through the internal bores 26 of the fibers 24. Thusly, there is provided a system in which there is present a uniform pressure gradient along each minuscule portion of the longitudinal area of the individual hollow fibers. This insures a maximum uniform transfer rate along the entire length of each of the fibers and minimizes localized rupture forces. With such an arrangement, the device of the invention may successfully be used in connection with a wide range of separatory operations.

The treated fluid, for example the processed blood, which is emitted from the second end of the hollow fiber bundles is adapted to flow directly into fluid outlet 36. To prevent flow of the treated fluid toward outlet 22, the second end of the fibers 24 which extend into second end portion 18 are similarly sealed in a suitable potting compound which is formed into a disc shaped member substantially identical in shape to member 38. The sealing means, or disc shaped potting compound, just described also functions to cause the dialysate fluid which is emitted from the external passageways 28 at the second end of the device, to flow toward the fluid outlet 22.

A wide variety of potting compounds, or cements can be used as the sealing means of the present invention. These include thermal setting artificial rubbers, acrylic resins, phenolaldehydes, and other liquid settable organic cements. However, it has been found that the urethane resins provide a superior sealing compound for most applications. Such resins are typically inert to chemical or solvent action and provide a fluid proof seal at the pressures and temperatures to which the permeability separatory apparatus is submitted. The urethane resin, when set within end portion 16 of the housing, fills the interstices, or passageways, 28 proximate the end of the individual fibers 24a so that all fluid entering the apparatus through inlet 34 will flow into the central bores or passageways 26 of the fibers 24. Similarly, with the second ends of the fibers sealed with respect to end portion 18 of the housing, the treated fluid flowing from the outlet end of the fiber bundles will be forced through outlet 36 and cannot find its way into outlet 22.

In practice, a wide variety of materials may be used to construct the hollow fibers 24. One material which has proved highly satisfactory for a wide variety of applications is cellulose. This material, in fiber form, has excellent qualities of permeation, cost, strength and resistance to chemical or solvent action.

Where it is desired particularly to separate organic components from fluid, various materials are equally suitable, including synthetic linear polyamides, polycarbonates, polyvinyl chloride, arcylic ester polymers, organic silicone polymers, polyurethanes, styrene polymers and various other polyolefins or mixtures thereof. Any of these materials, as well as various other suitable hollow fiber forming materials, may be used for a wide variety of separatory proceedures using the device of the invention including selective separation of non-ionic emissible or soluable fluid components.

Where the hollow fiber membranes are used in ion exchanging, or like separatory processes, the reagent or reagents necessary to produce the desired ion exchange or similar separation can, if desired, be incorporated into the fiber forming polymeric material prior to its formation into the hollow fibers.

The optimum dimensions for the hollow fibers will vary according to the particular process for which they are utilized and will also vary in accordance with the tensile strength of the fiber forming material. In general, however, the fibers should be able to withstand pressures in the range of 1 to 150 pounds per square inch. The outside diameter of the fibers may range from about 8 to 600 microns with a wall thickness of in the range of about 1 micron to about 50 microns. Depending upon the application to be made of the apparatus and number of individual fibers used may range from a few hundred to many thousands.

As previously discussed, a novel feature of the apparatus of the present invention is the unique non-cylindrical configuration of the central body portion 14 which supports the fiber bundles. Unexpectedly, experience has shown that the use of a non-circular central body portion substantially reduces the degree of channeling of the first fluid as it passes through the apparatus. In the embodiment of the invention shown in FIGS. 1 through 3, the central body portion is oval shaped. The reduced cross-section of the individual fiber bundles in conjunction with this unique oval shaped housing permits increased penetration of the first, or dialysate solution, thereby making the device substantially more efficient than prior art devices embodying cylindrically shaped central body portions.

Figure 4:
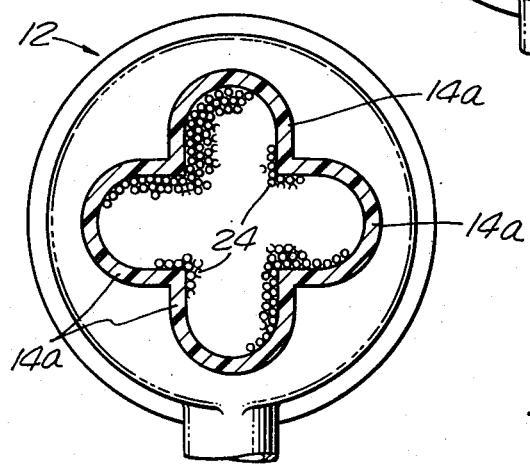
FIG. 4 is a cross-sectional view similar to FIG. 3 showing another form of the invention having a differently configured body portion.

In FIG. 4 there is illustrated another embodiment of the apparatus of the invention. In this form of the invention, the central body portion 14 is clover shaped comprising four longitudinally extending, interconnected U-shaped portions 14a, each of which is adapted to support one or more fiber bundles.

Figure 5:
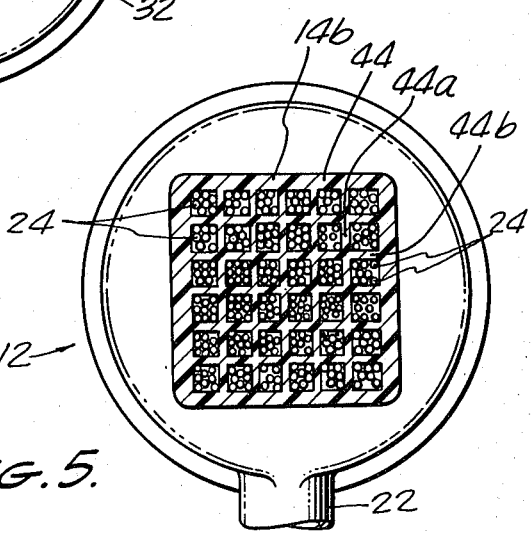
FIG. 5 is a cross-sectional view similar to FIGS. 3 and 4 showing yet another form of the Mass Transfer Device of the invention.

In FIG. 5 there is shown still another embodiment of the invention wherein the central body portion 4b is rectangular in shape and includes at each end thereof a grid member 44. This grid member comprises a regular lattice of substantially vertical and horizontal elements 44a and 44b which cooperate to define a plurality of openings, each of which is adapted to support the end portions of a fiber bundle comprising a multiplicity of individual fibers 24.

Experience has shown that the configuration of the body portions 14a and 14b, like the oval shaped configuration of the body portion as illustrated in FIG. 3, function to substantially reduce fluid channeling of the external, or first fluid, around the fibers bundles, thus remarkably enhancing the mass transfer efficiency of the device.

Another extremely important aspect of the separatory apparatus of the present invention concerns the provision of distribution means for directing the flow of the external, or first, fluid from the first fluid inlet in end portion 16 into the passageways formed between the contiguous hollow fibers which make up the fiber bundles of the apparatus. This unique distribution means is central disposed within the first end portion 16 of housing 12 and performs the important function of directing the first, or dialysate, fluid so that it will flow continuously and uniformly through the passageways 28 defined between the contiguous fibers 24 (FIG. 10).

Turning now particularly to FIGS. 6 and 7, one form of distribution means of the invention can be seen to comprise a comb-shaped element 46 having a plurality of substantially vertically extending fingers 48 (FIG. 7) each of which is provided along its length with a plurality of transversely extending protuberances 49. Distributor member 46 is strategically located intermediate first end portion 16 of housing 12 and is securely held in place by the sealing means of potting compound 38. As best seen by referring to FIG. 6, distributor means 46 is adapted to engage the fibers 24 which make up the fiber bundles to cause the first end portions 50 thereof to diverge radially outwardly within the end portion 16. This divergence of the fiber ends tends to further improve the dialysate fluid flow characteristics and mitigate against channeling.

In the form of the invention shown in FIGS. 6 and 7, the central body portion is shown to be oval shaped with first and second end portions and the cover members being configured identically to those members as previously described in connection with FIGS. 1 through 3. As was the case with this previously described form of the invention, cover member 16 is provided with a first fluid inlet 20 and cover 30 is provided with a second fluid inlet 34 in communication with the first end portion 50 of the hollow fibers 24. Also provided in this form of the invention is the disc-shaped sealing means 38 which, in conjunction with the distributor means 46, function to uniformly control the flow of the external fluid through the passageways 26.

Referring to FIG. 9, there is shown yet another embodiment of the present invention. In this construction the distribution means comprises a comb-shaped element 52 of somewhat similar configuration to element 46 having a plurality of substantially vertically extending fingers 54. In this instance, however, fingers 54 are not provided with the transversely extending protuberances 49 characteristic of the previously described comb-shaped distribution member.

As was the case with the embodiment shown in FIGS. 6 and 7, comb-shaped member 52 is fixedly positioned intermediate end portion 16 by means of the shaped potting compound and is adapted to engage the fibers 24 causing the end portions thereof to divert radially outwardly within end portions 16.

Turning now to FIG. 8, there is illustrated still another form of the apparatus of the invention wherein the distributor member 56 is grid shaped having a plurality of openings 57 each of which is adapted to support the extremities of one or more fiber bundles designated in FIG. 8 by the numeral 14c. This distribution means or distributor member 56 includes a plurality of interconnected vertically extending members 58 and horizontally extending members 60. These members are formed into a regular lattice work which define the openings through which the ends of the fiber bundles 14c protrude.

Each of the distributor members 46, 52 and 56 can be used interchangeably with the devices of the invention having body portions 14 configured in the manner illustrated in FIGS. 3, 4 and 5, i.e. oval, rectangular and clover shaped in cross-section.

In the operation of the apparatus of the invention for processing blood, the raw blood is introduced into the unit through inlet 34. The untreated blood then passes continuously through the internal passageways 24 of the hollow fibers and flows at a uniform rate toward the second, or left end of the device as viewed in FIGS. 1 and 2. Simultaneously, a first fluid in the form of a dialysate is introduced through inlet 20. In the manner previously described, this fluid is directed by the disc shaped member 38 and the distributor members 46, 52 or 56 evenly and uniformly into the passageways 28 formed between the contiguous fibers of the fibers bundles which are supported within the body portion 14. This dialysate fluid flows uniformly along the external surfaces of the fibers 24 and at the left end of the unit is emitted through outlet 22. Similarly, the treated blood, after having passed through the internal bores of the fibers is emitted at the left end of the unit through outlet 36. Accordingly, when the unit is used for purification of blood, the first fluid comprises a suitable dialysate and the second fluid, which is emitted through outlet 22, comprises the modified dialysate, which has passed through the unit externally of the contiguous fibers 24. The third fluid, of course, is the raw, or untreated, blood which is introduced into the unit through inlet 34 and the fourth fluid is the treated blood which is emitted from the unit through outlet 36.

It is to be appreciated that the treatment of blood is only one of the many uses of the apparatus of the invention. Through proper selection of materials, the device can readily be used by a great number of mass transfer or separatory applications, including the removal of glyceral from frozen blood, desalination operations, and numerous other fluid treatments which can be carried out by direct osmosis and/or dialysis.

It is also to be appreciated that the apparatus of the invention can be used for reverse osmosis or ultrafiltration. When so used, the multi-component fluid or solution to be treated is passed around the exterior surfaces of the hollow fibers. In such cases, the multi-component fluid is maintained at a pressure in excess of the specific osmotic pressure dictated by the membrane material used. The pressures required to produce reverse osmosis are in most cases substantial, as for example, on the order of 100 to 150 pounds per square inch. However, the reverse osmosis process functions within such pressure ranges for almost all fluids given the appropriate choice of membrane material.

When the apparatus of the invention as shown in the drawings is used for reverse osmosis, it is to be understood that the multi-component fluid to be treated is introduced through inlet 20 and is withdrawn from the unit through outlet 22. Similarly the appropriate rinsing fluid is introduced into the apparatus through inlet 34, passes through the interior bores of the fibers and is ejected through outlet 36.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A dialyzer comprising:
    (a) a housing including an oval shaped central hollow body portion and integral first and second enlarged end portions which are circular in cross-section at any point, said first end portion having a first fluid inlet for passage of a dialysate fluid and said second portion having a first fluid outlet for passage of the modified dialysate fluid;
    (b) a plurality of fiber bundles housed within and supported by said central hollow body portion, said fiber bundle comprising a multiplicity of longitudinally extending, contiguous capillary fibers each having an interior bore throughout its length and each having open first and second end portions extending respectively into said first and second end portions of said housing, said fibers being arranged within each said bundle to provide a multiplicity of substantially uniform fluid flow passageways interiorly of said fibers and exteriorly between said contiguous fibers;
    (c) first and second closure means adapted to cover respectively said first and second end portions of said housing, said first closure means having a second fluid inlet in communication with said first end portions of said hollow fibers for passage of blood and said second closure means having a second fluid outlet in communication with said second end portions of said hollow fibers for passage of the treated blood;
    (d) sealing means disposed within said first end portion of said housing for preventing flow of the dialysate fluid between said first fluid inlet and the interior bores of said hollow fibers, said sealing means being configured and arranged to cause said dialysate fluid to flow uniformly through said fluid flow passageways between contiguous hollow fibers;
    (e) sealing means disposed within said second end portion of said housing for preventing flow of treated blood between said interior bores of said hollow fibers and said first fluid outlet; and
    (f) means disposed intermediate said first end portion of said housing for directing the flow of said dialysate fluid from said first fluid inlet into the passageways formed between said contiguous hollow fibers of said fiber bundle whereby said dialysate fluid will flow uniformly between said fibers, said means comprising a comb shaped element having a plurality of fingers extending transversely of said first end portion.

2. A separatory apparatus for selectively separating components of multi-component fluids, comprising:
   (a) an elongated housing including a non-cylindrically shaped central hollow body portion and integral first and second enlarged end portions which are circular in cross-section at any point, said first end portion having a first fluid inlet for passage of a first fluid and said second portion having a first fluid outlet for passage of a second fluid;
   (b) at least one fiber bundle housed within and supported by said central hollow body portion, said fiber bundle comprising a multiplicity of longitudinally extending, contiguous, hollow capillary fibers each having an interior bore throughout its length and each having open first and second end portions extending respectively into said first and second end portions of said housing, said fibers being arranged within each said bundle to provide a multiplicity of substantially uniform fluid flow passageways interiorly of said fibers and exteriorly between said contiguous fibers;
   (c) first and second cover means adapted to cover respectively said first and second end portions of said housing, said first cover means having a second fluid inlet in communication with said first end portions of said hollow fibers for passage of a third fluid and said second cover means having a second fluid outlet in communication with said second end portions of said hollow fibers for passage of a fourth fluid;
   (d) sealing means disposed within said first end portion of said housing for preventing fluid flow between said first fluid inlet and the interior bores of said hollow fibers, said sealing means being configured and arranged to cause said first fluid to flow uniformly through said fluid flow passageways between contiguous hollow fibers;
   (e) sealing means disposed within said second end portion of said housing for preventing fluid flow between said interior bores of said hollow fibers and said first fluid outlet; and
   (f) distributor means disposed intermediate said first end portion of said housing for directing the flow of said first fluid from said first fluid inlet into the passageways formed between said contiguous hollow fibers of said fiber bundle whereby said first fluid will flow uniformly between said fibers, said distributor means comprising a shaped element adapted to engage a portion of said fibers of said fiber bundle to cause the first end portions thereof to diverge radially outwardly within said first end portion, said shaped element comprising a combed shaped element having a plurality of substantially vertically extending fingers.

3. A separatory apparatus as defined in claim 2 in which each of said vertically extending fingers is provided along its length with a plurality of transversely extending protuberances.

4. A separatory apparatus for selectively separating components of multi-component fluids, comprising:
   (a) an elongated housing including a non-cylindrically shaped central hollow body portion and integral first and second enlarged end portions which are circular in cross-section at any point, said first end portion having a first fluid inlet for passage of a first fluid and said second portion having a first fluid outlet for passage of a second fluid;
   (b) a plurality of fiber bundles housed within and supported by said central hollow body portion, said fiber bundle comprising a multiplicity of longitudinally extending, contiguous, hollow capillary fibers each having an interior bore throughout its length and each having open first and second end portions extending respectively into said first and second end portions of said housing, said fibers being arranged within each said bundle to provide a multiplicity of substantially uniform fluid flow passageways interiorly of said fibers and exteriorly between said contiguous fibers;
   (c) first and second cover means adapted to cover respectively said first and second end portions of said housing, said first cover means having a second fluid inlet in communication with said first end portions of said hollow fibers for passage of a third fluid and said second cover means having a second fluid outlet in communication with said second end portions of said hollow fibers for passage of a fourth fluid;
   (d) sealing means disposed within said first end portion of said housing for preventing fluid flow between said first fluid inlet and the interior bores of said hollow fibers, said sealing means being configured and arranged to cause said first fluid to flow uniformly through said fluid flow passageways between contiguous hollow fibers;
   (e) sealing means disposed within said second end portion of said housing for preventing fluid flow between said interior bores of said hollow fibers and said first fluid outlet; and
   (f) distributor means disposed intermediate said first end portion of said housing for directing the flow of said first fluid from said first fluid inlet into the passageways formed between said contiguous hollow fibers of said fiber bundle whereby said first fluid will flow uniformly between said fibers, said distributor means comprising a shaped element adapted to engage a portion of said fibers of said fiber bundle to cause the first end portions thereof to diverge radially outwardly within said first end portion, said shaped element comprising a lattice of rows and columns defining a plurality of openings each of which is adapted to support a fiber bundle proximate the end portions thereof.

* * * * *